United States Patent
Kaufman et al.

(10) Patent No.: US 12,436,856 B2
(45) Date of Patent: Oct. 7, 2025

(54) SYSTEM AND METHOD FOR DATA DRIVEN PERFORMANCE SYSTEM TESTING

(71) Applicant: Dell Products L.P., Round Rock, TX (US)

(72) Inventors: David Alexander Kaufman, Beer-Sheva (IL); Michael Timmy Opachevsky, Eilat (IL)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 18/460,927

(22) Filed: Sep. 5, 2023

(65) Prior Publication Data
US 2025/0077373 A1 Mar. 6, 2025

(51) Int. Cl.
*G06F 11/22* (2006.01)

(52) U.S. Cl.
CPC .............................. *G06F 11/2273* (2013.01)

(58) Field of Classification Search
CPC .................. G06F 11/22; G06F 11/2273
See application file for complete search history.

(56) References Cited

U.S. PATENT DOCUMENTS

| | | | |
|---|---|---|---|
| 6,269,457 B1* | 7/2001 | Lane | G06F 11/3688 714/48 |
| 7,694,181 B2* | 4/2010 | Noller | G06F 11/3688 714/38.11 |
| 8,347,267 B2* | 1/2013 | Givoni | G06F 11/3688 717/124 |
| 2007/0234293 A1* | 10/2007 | Noller | G06F 11/3688 717/124 |
| 2014/0109050 A1* | 4/2014 | Gibbens | G06F 11/368 717/124 |
| 2014/0109063 A1* | 4/2014 | Schissel | G06F 11/3688 717/127 |
| 2016/0283356 A1* | 9/2016 | Waldman | G06F 11/3698 |
| 2019/0057014 A1* | 2/2019 | Shalev | G06F 11/368 |
| 2019/0213660 A1* | 7/2019 | Astrada | G06Q 40/02 |
| 2019/0340095 A1* | 11/2019 | Faibish | G06F 11/302 |
| 2022/0100632 A1* | 3/2022 | Kulkarni | G06F 11/302 |
| 2023/0185700 A1* | 6/2023 | Wong | G06F 11/3688 714/38.1 |

\* cited by examiner

*Primary Examiner* — Kamini B Patel
(74) *Attorney, Agent, or Firm* — Brian J. Colandreo; Heath M. Sargeant; Holland & Knight LLP

(57) ABSTRACT

A method, computer program product, and computing system for identifying a computing device from a plurality of computing devices for executing a new test. Testing results associated with the identified computing device are processed from a database of testing results. A candidate test is identified from a plurality of tests to execute on the identified computing device by processing a testing profile associated with the identified computing device and the testing results associated with the identified computing device. The candidate test is executed on the identified computing device.

14 Claims, 4 Drawing Sheets

SYSTEM AND METHOD FOR DATA DRIVEN PERFORMANCE SYSTEM TESTING

BACKGROUND

The fast-moving nature of software development can pose a significant challenge when it comes to comprehensive testing of each version. With many versions and an increasing number of configurations to test, incomplete testing of software versions is becoming more common. Engineers recognize that it is impossible to test every single configuration, and therefore, they focus on defining test configurations that yield the most accurate and relevant results.

In addition to the challenge of incomplete testing, relying solely on human oversight to track tests on a daily basis, especially during weekends and holidays, is an ineffective approach. With so many configurations to consider, an engineer may lack a comprehensive view of the overall test coverage and may inadvertently repeat previously tested configurations or prioritize debugging specific features.

SUMMARY OF DISCLOSURE

In one example implementation, a computer-implemented method executed on a computing device may include, but is not limited to, identifying a computing device from a plurality of computing devices for executing a new test. Testing results associated with the identified computing device are processed from a database of testing results. A candidate test is identified from a plurality of tests to execute on the identified computing device by processing a testing profile associated with the identified computing device and the testing results associated with the identified computing device. The candidate test is executed on the identified computing device.

One or more of the following example features may be included. Identifying the computing device may include identifying an idle computing device. Identifying the candidate test may include identifying the candidate test based upon, at least in part, an installation type for the test, a test type, and a connectivity protocol for the test. The testing profile is generated by generating a matrix of weights based upon, at least in part, a plurality of test configurations, wherein each test configuration may include an installation type for the test and a test type. Generating the matrix of weights may include generating a matrix of weights for each connectivity protocol of a plurality of connectivity protocols. Identifying the candidate test may include determining a debt matrix based upon, at least in part, the matrix of weights and the testing results. Identifying the candidate test may include determining a test configuration with a highest debt from the debt matrix.

In another example implementation, a computer program product resides on a computer readable medium that has a plurality of instructions stored on it. When executed by a processor, the instructions cause the processor to perform operations that may include, but are not limited to, identifying a computing device from a plurality of computing devices for executing a new test. Testing results associated with the identified computing device are processed from a database of testing results. A candidate test is identified from a plurality of tests to execute on the identified computing device by processing a testing profile associated with the identified computing device and the testing results associated with the identified computing device. The candidate test is executed on the identified computing device.

One or more of the following example features may be included. Identifying the computing device may include identifying an idle computing device. Identifying the candidate test may include identifying the candidate test based upon, at least in part, an installation type for the test, a test type, and a connectivity protocol for the test. The testing profile is generated by generating a matrix of weights based upon, at least in part, a plurality of test configurations, wherein each test configuration may include an installation type for the test and a test type. Generating the matrix of weights may include generating a matrix of weights for each connectivity protocol of a plurality of connectivity protocols. Identifying the candidate test may include determining a debt matrix based upon, at least in part, the matrix of weights and the testing results. Identifying the candidate test may include determining a test configuration with a highest debt from the debt matrix.

In another example implementation, a computing system includes at least one processor and at least one memory architecture coupled with the at least one processor, wherein the at least one processor configured to identify a computing device from a plurality of computing devices for executing a new test. Testing results associated with the identified computing device are processed from a database of testing results. A candidate test is identified from a plurality of tests to execute on the identified computing device by processing a testing profile associated with the identified computing device and the testing results associated with the identified computing device. The candidate test is executed on the identified computing device.

One or more of the following example features may be included. Identifying the computing device may include identifying an idle computing device. Identifying the candidate test may include identifying the candidate test based upon, at least in part, an installation type for the test, a test type, and a connectivity protocol for the test. The testing profile is generated by generating a matrix of weights based upon, at least in part, a plurality of test configurations, wherein each test configuration may include an installation type for the test and a test type. Generating the matrix of weights may include generating a matrix of weights for each connectivity protocol of a plurality of connectivity protocols. Identifying the candidate test may include determining a debt matrix based upon, at least in part, the matrix of weights and the testing results. Identifying the candidate test may include determining a test configuration with a highest debt from the debt matrix.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
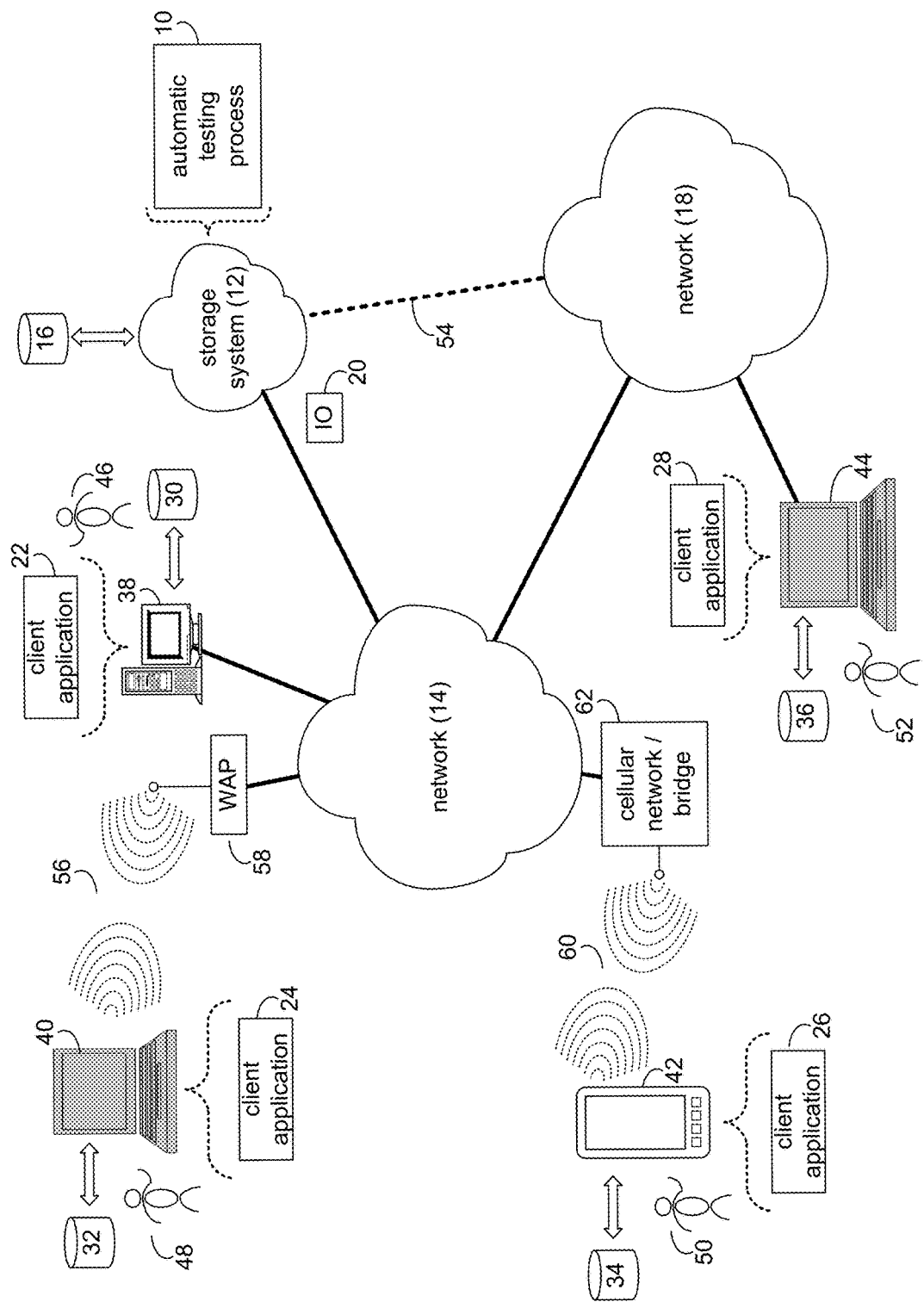
FIG. 1 is an example diagrammatic view of a storage system and an automatic testing process coupled to a distributed computing network according to one or more example implementations of the disclosure.

System Overview:

Referring to FIG. 1, there is shown automatic testing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of automatic testing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of automatic testing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11 g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data replication process, such as automatic testing process 10 of FIG. 1, may include but is not limited to, identifying a computing device from a plurality of computing devices for executing a new test. Testing results associated with the identified computing device are processed from a database of testing results. A candidate test is identified from a plurality of tests to execute on the identified computing device by processing a testing profile associated with the identified computing device and the testing results associated with the identified computing device. The candidate test is executed on the identified computing device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
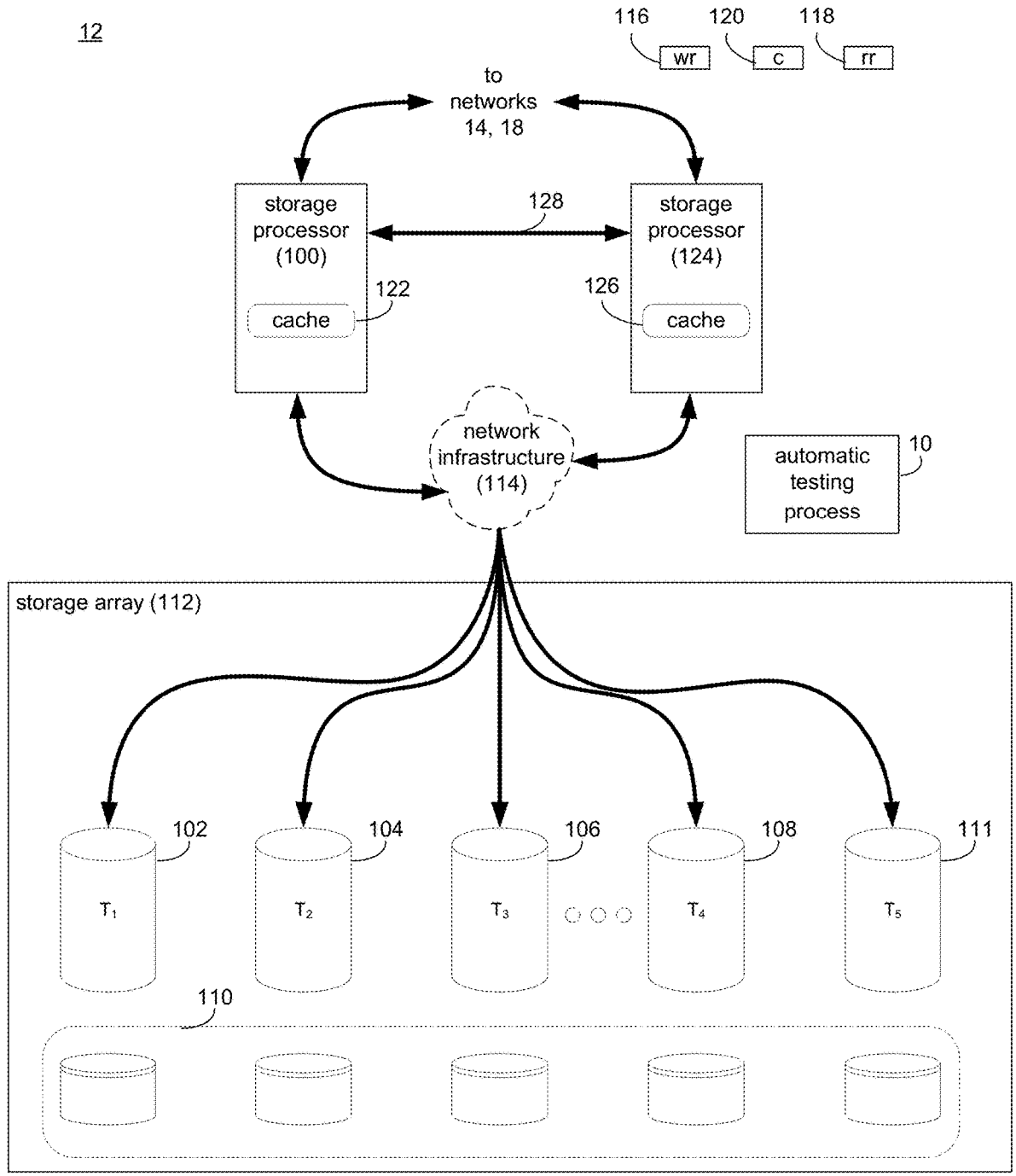
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of automatic testing process 10. The instruction sets and subroutines of automatic testing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of automatic testing process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of automatic testing process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of automatic testing process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

Figure 3:
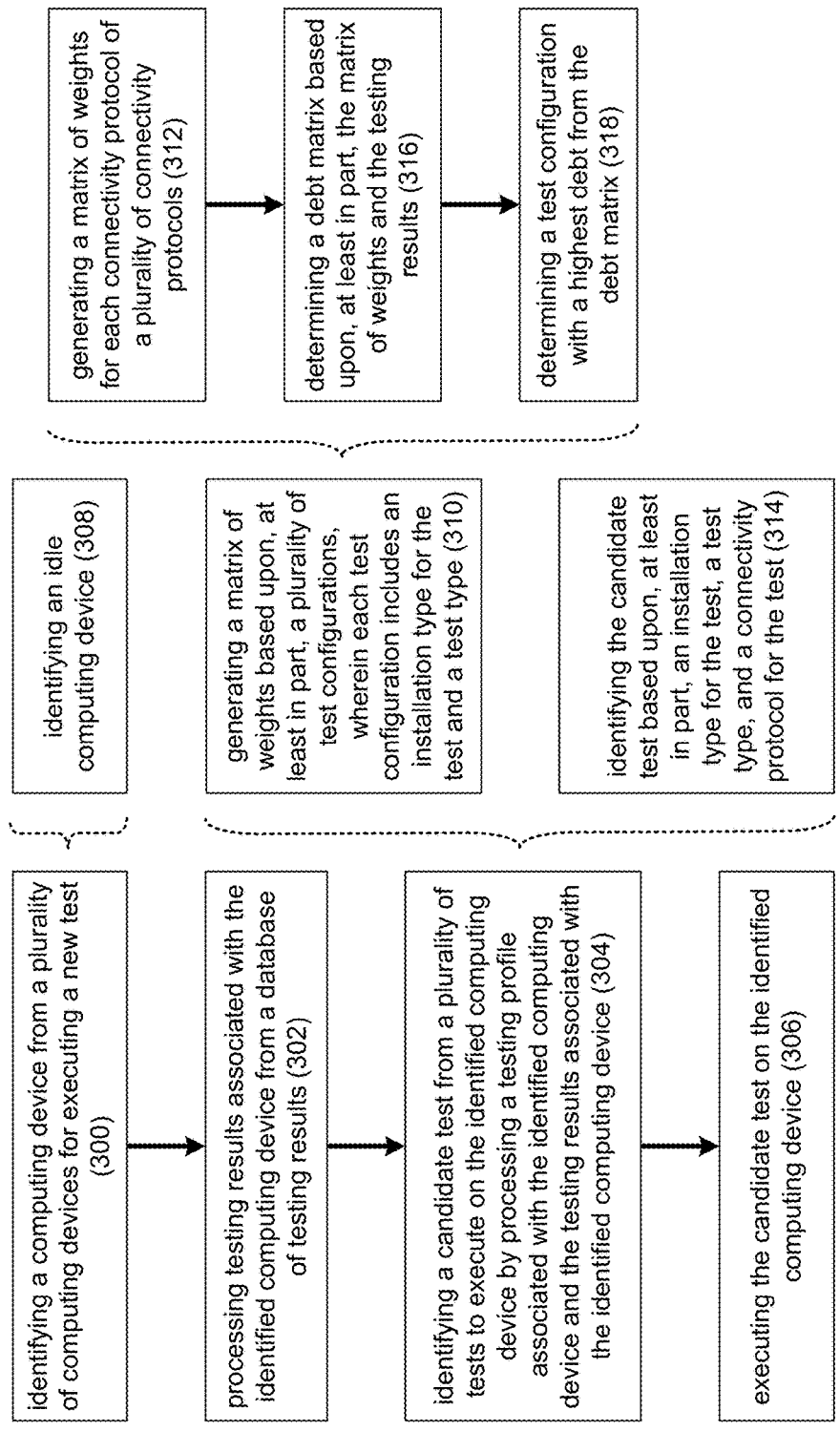
FIG. 3 is an example flowchart of the automatic testing process according to one or more example implementations of the disclosure.
Figure 4:
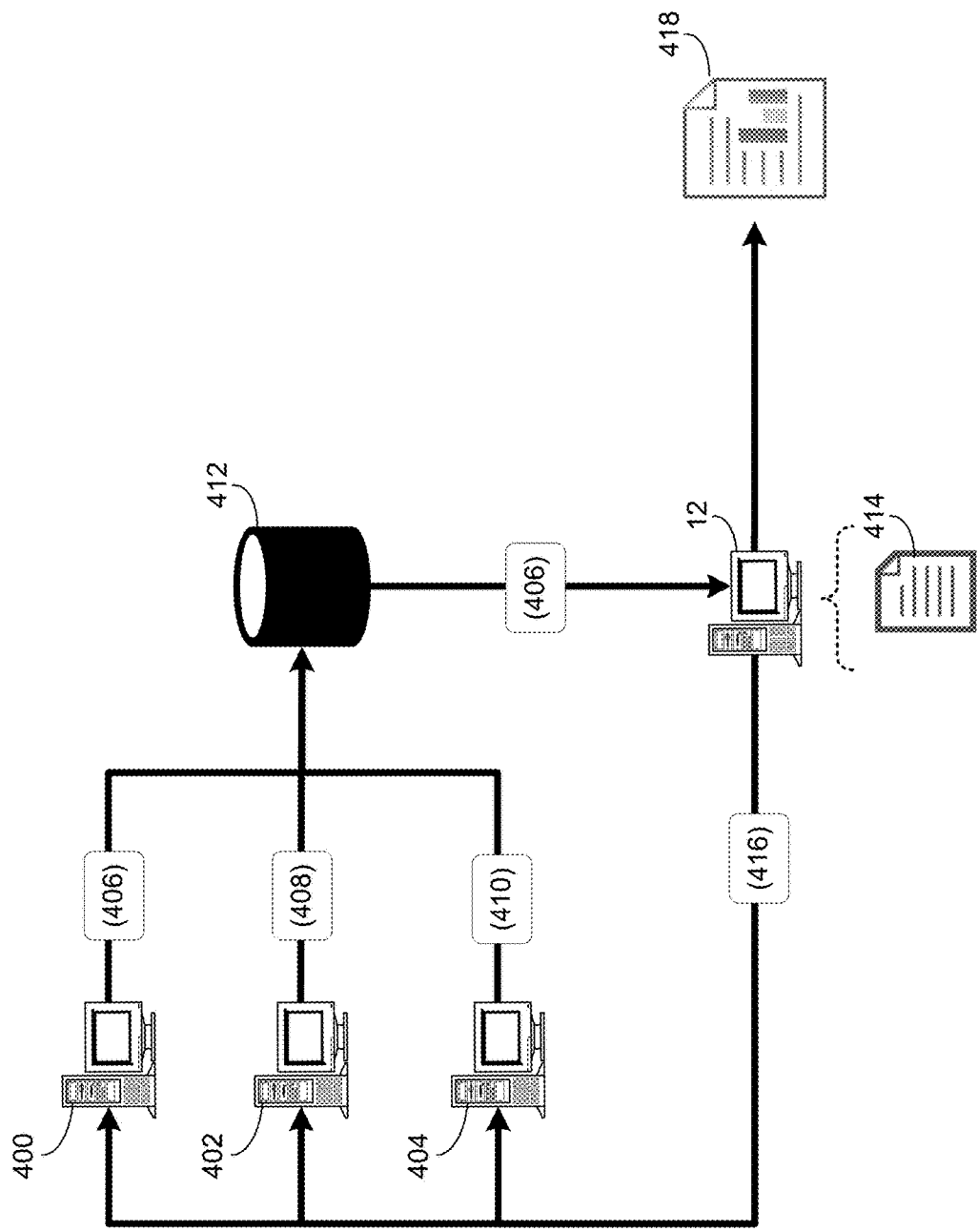
FIG. 4 is an example diagrammatic view of the automatic testing process according to one or more example implementations of the disclosure.

The Automatic Testing Process:

Referring also to the examples of FIGS. 3-4 and in some implementations, automatic testing process 10 may identify 300 a computing device from a plurality of computing devices for executing a new test. Testing results associated with the identified computing device are processed 302 from a database of testing results. A candidate test is identified 304 from a plurality of tests to execute on the identified computing device by processing a testing profile associated with the identified computing device and the testing results associated with the identified computing device. The candidate test is executed 306 on the identified computing device.

As will be discussed in greater detail below, implementations of the present disclosure may allow for automated testing across a plurality of computing devices using a testing profile. Implementations of the present disclosure choose a relevant test configuration in a way that increases the test coverage and minimizes machine idle time. In addition, automatic testing process 10 generates a clear and concise report that summarizes the results for engineers to review and make informed decisions.

In some implementations, automatic testing process 10 identifies 300 a computing device from a plurality of computing devices for executing a new test. Referring also to FIG. 4 and in one example, suppose a plurality of computing devices (e.g., computing devices 400, 402, 404) are performing a series of tests. As will be described in greater detail below, each of computing devices 400, 402, 404 may have different characteristics (e.g., machine types, hardware, software, location, etc.) for testing different properties. In this example, computing devices 400, 402, 404 may receive instructions for performing tests during prescribed periods of time (e.g., during non-peak hours, during particular hours to test specific features, etc.). Each test may require specific machine characteristics that may limit the number of computing devices capable of performing a given test. A test may generally include a series of instructions to implement at least a portion of computing device functionality using a testing computing device. Tests may include various subtests for executing on a computing device. In one example, a test may be designed to test a computing device's ability to read and write data to a particular storage device of the computing device. In another example, a test may be designed to test network connectivity between a storage processor and network-attached storage devices. In another example, a test may be designed to stress test communication bandwidth between a host and a storage processor. Accordingly, it will be appreciated that various tests may be performed on a computing device (e.g., a storage processor (e.g., storage processors 100, 124)) within the scope of the present disclosure.

In some implementations, automatic testing process 10 may include specific criteria for identifying 300 a computing device to execute a new test. For example, tests may include relative priorities that may determine which computing device to use for executing a new, high priority test. In another example, automatic testing process 10 may receive a selection (e.g., from a user or other system) for a particular computing device. Suppose that a previous test generated anomalous results. In this example, a user or a particular process may desire to repeat the test that generated in anomalous results using the same computing device. Accordingly, automatic testing process 10 may identify 300 a specific computing device.

In some implementations, identifying 300 the computing device includes identifying 308 an idle computing device. For example, automatic testing process 10 may actively monitor the availability of computing devices (e.g., computing devices 400, 402, 404) over a period of time (e.g., continuously, monitoring during a predefined interval, etc.) to determine when a computing device is available to perform a new test. In some implementations, automatic testing process 10 may determine when a computing device completes a test and provides results (e.g., testing results 406, 408, 410) to a database (e.g., database 412). In response to receiving testing results (e.g., testing results 406, 408, 410), automatic testing process 10 determines whether any of the computing devices (e.g., computing devices 400, 402, 404) are idle (i.e., not currently performing a test or other active processing). In some implementations, an idle computing device may be identified 308 based upon, at least in part, a threshold amount of time that the computing device is not actively processing a test or other task. Suppose that automatic testing process 10 identifies 308 computing device 400 as being idle. In this example, automatic testing process 10 identifies 308 computing device 400 for executing a new test.

In some implementations, automatic testing process 10 processes 302 testing results associated with the identified computing device from a database of testing results. For example, in response to identifying 300 a computing device for executing a new test, automatic testing process 10 obtains testing results associated with the identified computing device. Returning to the above example where automatic testing process 10 identifies computing device 400, automatic testing process 10 obtains and processes 302 testing results (e.g., testing results 406) associated with computing device 400 from database 412. In this example, testing results 406 includes all testing results associated with the identified computing device and/or all testing results associated with a computing device of a particular type or with certain characteristics (e.g., hardware, software, networking connectivity, etc.). In this manner, automatic testing process 10 can process 302 testing results for tests executed by a particular computing device (e.g., computing device 400) or of computing devices of a particular type.

In some implementations, automatic testing process 10 identifies 304 a candidate test from a plurality of tests to execute on the identified computing device by processing a testing profile associated with the identified computing device and the testing results associated with the identified computing device. For example, automatic testing process 10 uses a testing profile (e.g., testing profile 414) to identify 304 a candidate test from a plurality of tests to execute on the identified computing device (e.g., computing device 400). Testing profile 414 is a goal or series of goals that an engineer or other user would like each computing device to achieve, with respect to its type, such that each automatic test run will yield far more relevant results, that is, increase the overall test coverage. In some implementations, testing profile 414 is a matrix of weights for particular features to be tested. For example, a test may include features describing an installation type for the test (e.g., how the underlying storage system works), a test type (e.g., whether the test concerns a performance benchmarking, a high availability test that simulates failure scenarios, a non-destructive upgrade that simulates upgrading a software version, a rebuild test for rebuilding a RAID array, etc.), a type of connectivity protocol (e.g., Non-volatile Memory Express (NVMe) or Small Computer System Interface (SCSI)), etc. While various examples of test features have been described, it will be appreciated that any test feature may be used to differentiate tests within the scope of the present disclosure.

In some implementations, automatic testing process 10 generates 310 the testing profile by generating a matrix of weights based upon, at least in part, a plurality of test configurations, wherein each test configuration includes an installation type for the test and a test type. For example, suppose automatic testing process 10 receives the following test feature allocations:

For an installation type, the tests should be split with 80% for block optimized (BO) and 20% for unified (UN);

For a test type, 59% should be performance benchmarking (VBP), 17% should be non-destructive upgrades (NDU), 12% should be high-availability (HA), and 12% should be RAID rebuilds (RB); and For a connectivity protocol, 30% should be NVMe and 70% should be SCSI.

As shown above, these test feature allocations may be received from a user (e.g., using a user interface), another process or computing device, and/or as default values. Accordingly, automatic testing process 10 may generate 310 a matrix of weights for a plurality of test configurations, where each test configuration includes an installation type for the test and a test type. Referring again to the above example, automatic testing process 10 generates 310 a matrix of weights as shown in Table 1 below where the weights define a relative importance or priority for performing a test with a certain test configuration (e.g., combination of installation type, test type, and/or connectivity protocol):

TABLE 1

Feature weight matrix

|  | BO | UN |  |
|---|---|---|---|
| VBP | 50 | 9 | 59 |
| NDU | 10 | 7 | 17 |
| HA | 10 | 2 | 12 |
| RB | 10 | 2 | 12 |
|  | 80 | 20 |  |

In some implementations, generating 310 the matrix of weights includes generating 312 a matrix of weights for each connectivity protocol of a plurality of connectivity protocols. For example, automatic testing process 10 generates 312 a matrix of weights for different test configurations (e.g., combinations of installation types and test types) for each connectivity protocol as shown below in Tables 2-3:

TABLE 2

Feature weight matrix for NVMe

|     | BO   | UN   |      |
|-----|------|------|------|
| VBP | 35   | 6.3  | 41.3 |
| NDU | 7    | 4.9  | 11.9 |
| HA  | 15.6 | 13.8 | 29.4 |
| RB  | 9.4  | 8    | 17.4 |
|     | 67   | 33   | 100  |

TABLE 3

Feature weight matrix for SCSI

|     | BO   | UN   |      |
|-----|------|------|------|
| VBP | 25   | 17.7 | 42.7 |
| NDU | 9.7  | 5.1  | 14.8 |
| HA  | 15   | 12.2 | 27.2 |
| RB  | 10.2 | 5    | 15.3 |
|     | 60   | 40   | 100  |

In some implementations, identifying 304 the candidate test includes identifying 314 the candidate test based upon, at least in part, an installation type for the test, a test type, and a connectivity protocol for the test. For example, a candidate test (e.g., candidate test 416) is identified 314 based upon, at least in part, various characteristics or test configurations. In one example, the combination of an installation type for the test (e.g., block optimized or unified), a test type (e.g., a performance benchmarking, a high availability test that simulates failure scenarios, a non-destructive upgrade that simulates upgrading a software version, a rebuild test for rebuilding a RAID array, etc.), and a connectivity protocol (e.g., NVMe or SCSI) define a unique test configuration. Accordingly, automatic testing process 10 identifies 318 a candidate test (e.g., candidate test 416) by processing the testing results (e.g., testing results 406) and the testing profile (e.g., testing profile 414) to identify test configurations that have yet to be performed and which test configuration should be executed next.

In some implementations, automatic testing process 10 determines 316 a debt matrix based upon, at least in part, the matrix of weights and the testing results. For example, a debt matrix is a weighted representation of testing results relative to the matrix of weights of the testing profile. For example, a debt for each test configuration may be defined as follows in Equation 1:

$$\text{debt} = \frac{\text{amount of verified test with given test configuration}}{\text{amount of overall tests}} - \text{weight} \quad (1)$$

As shown above in Equation 1, the debt or weighting for each test configuration is defined as the ratio of the number or amount of verified tests executed for a given test configuration divided by the total number or amount of tests executed on a particular computing device. Examples of verified tests are described in U.S. Pat. No. 11,681,600, filed Jul. 28, 2021, entitled "Test System For Data Storage System Performance Testing", which reference is hereby incorporated herein in its entirety. Returning to Equation 1, the quotient is subtracted by the corresponding weight from the matrix of weights. In this manner, automatic testing process 10 determines a debt matrix by determining a debt for each test configuration in each matrix of weights for each connectivity protocol. Continuing with the above example, automatic testing process 10 determines 316 a debt matrix for the SCSI protocol as shown below in Table 4:

TABLE 4

Debt matrix for SCSI

|     | BO    | UN    |
|-----|-------|-------|
| VBP | 6.6   | −0.51 |
| NDU | 1.32  | −1.34 |
| HA  | −4.34 | −2    |
| RB  | 0.38  | −0.11 |

In some implementations, identifying 304 the candidate test includes determining 318 a test configuration with a highest debt from the debt matrix. With a debt matrix for each connectivity protocol type, automatic testing process 10 determines 318 a test configuration with the highest debt for each protocol (i.e., the largest negative number in the debt matrix) and multiplies this debt by the protocol weight and makes the final decision as shown in Equation 2 for a SCSI connectivity protocol and an NVMe connectivity protocol.

$$\text{Decision} = \text{Min}(SCSI_{debt} * SCSI_{weight}, NVME_{debt} * NVME_{weight}) \quad (2)$$

As shown above in the debt matrix of Table 4, the largest negative number is for a test configuration with a high availability test type installed on a block optimized storage system (e.g., debt of −4.34). Accordingly, automatic testing process 10 identifies 304 a candidate test (e.g., candidate test 416) as a test with a high availability test type for block optimized storage.

In some implementations, automatic testing process 10 executes 306 the candidate test on the identified computing device. Returning to the above example, suppose automatic testing process 10 identifies 304 candidate test 416 as the new test to execute on computing device 400 based upon, at least in part, testing results 406 and testing profile 414. In this example, automatic testing process 10 instructs computing device 400 to execute candidate test 416. In this manner, once a decision is made as shown above in Equation 2, automatic testing process 10 automatically executes 306 the candidate test on the given computing device. Accordingly, automatic testing process 10 iteratively identifies an available computing device from the plurality of computing devices to continuously and automatically perform tests based on testing results and the testing profile.

In some implementations, automatic testing process 10 generates a report (e.g., report 418) for a user based upon, at least in part, the testing results. For example, report 418 may include testing profile 414 for a particular computing device (e.g., computing device 400), testing profiles for multiple computing devices, testing results for a particular computing device, testing results for multiple computing devices, and/or analytics concerning the execution of tests based upon a testing profile. In some implementations, report 418 may be communicated to other computing devices as requested (e.g., in response to a user request) and/or automatically in a periodic manner.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   identifying a computing device from a plurality of computing devices for executing a new test;
   processing testing results associated with the identified computing device from a database of testing results;
   identifying a candidate test from a plurality of tests to execute on the identified computing device by processing a testing profile associated with the identified computing device and the testing results associated with the identified computing device, wherein identifying the candidate test includes identifying the candidate test based upon, at least in part, an installation type for the test, a test type, and a connectivity protocol, wherein the candidate test increases test coverage and minimizes computing device idle time;
   generating the testing profile by generating a matrix of weights based upon, at least in part, a plurality of test configurations, wherein each test configuration includes an installation type for the test and a test type; and
   executing the candidate test on the identified computing device.

2. The computer-implemented method of claim 1, wherein identifying the computing device includes identifying an idle computing device.

3. The computer-implemented method of claim 1, wherein generating the matrix of weights includes generating a matrix of weights for each connectivity protocol of a plurality of connectivity protocols.

4. The computer-implemented method of claim 1, wherein identifying the candidate test includes determining a debt matrix based upon, at least in part, the matrix of weights and the testing results.

5. The computer-implemented method of claim 4, wherein identifying the candidate test includes determining a test configuration with a highest debt from the debt matrix.

6. A computer program product residing on a non-transitory computer readable medium having a plurality of instructions stored thereon which, when executed by a processor, cause the processor to perform operations comprising:
   identifying a computing device from a plurality of computing devices for executing a new test;
   processing testing results associated with the identified computing device from a database of testing results;
   identifying a candidate test from a plurality of tests to execute on the identified computing device by processing a testing profile associated with the identified computing device and the testing results associated with the identified computing device, wherein identifying the candidate test includes identifying the candidate test based upon, at least in part, an installation type for the test, a test type, and a connectivity protocol, wherein the candidate test increases test coverage and minimizes computing device idle time;
   generating the testing profile by generating a matrix of weights based upon, at least in part, a plurality of test configurations, wherein each test configuration includes an installation type for the test and a test type; and
   executing the candidate test on the identified computing device.

7. The computer program product of claim 6, wherein identifying the computing device includes identifying an idle computing device.

8. The computer program product of claim 6, wherein generating the matrix of weights includes generating a matrix of weights for each connectivity protocol of a plurality of connectivity protocols.

9. The computer program product of claim 6, wherein identifying the candidate test includes determining a debt matrix based upon, at least in part, the matrix of weights and the testing results.

10. The computer program product of claim 9, wherein identifying the candidate test includes determining a test configuration with a highest debt from the debt matrix.

11. A computing system comprising:
   a memory; and
   a processor configured to identify a computing device from a plurality of computing devices for executing a new test, to process testing results associated with the identified computing device from a database of testing results, to identify a candidate test from a plurality of tests to execute on the identified computing device by processing a testing profile associated with the identified computing device and the testing results associated with the identified computing device, wherein identifying the candidate test includes identifying the candidate test based upon, at least in part, an installation type for the test, a test type, and a connectivity protocol, wherein the candidate test increases test coverage and minimizes computing device idle time, to generate the testing profile by generating a matrix of weights based upon, at least in part, a plurality of test configurations, wherein each test configuration includes an installation type for the test and a test type, and to execute the candidate test on the identified computing device.

12. The computing system of claim 11, wherein identifying the computing device includes identifying an idle computing device.

13. The computing system of claim 11, wherein generating the matrix of weights includes generating a matrix of weights for each connectivity protocol of a plurality of connectivity protocols.

14. The computing system of claim 11, wherein identifying the candidate test includes determining a debt matrix based upon, at least in part, the matrix of weights and the testing results.

* * * * *